United States Patent [19]

Kleitz et al.

[11] Patent Number: 5,785,839
[45] Date of Patent: Jul. 28, 1998

[54] COMPOSITE STRUCTURE INCLUDING A SOLID ELECTROYLTE AND AT LEAST ONE VOLUME ELECTRODE

[75] Inventors: Michel Kleitz, Grenoble; Gaétan Mairesse; Jean-Claude Boivin, both of D'Ascq; Gilles Lagrange, Lew Bains, all of France

[73] Assignees: Ecole Nationale Superieure de Chimi de Lille, Universite des Sciences et Technologies de Lille, Villeneuve D'Ascq; L'Air Liquide, Societe Anonyme pour l'Etude et l'Exploitation des Procedes Georges Claude,, Paris, both of France

[21] Appl. No.: 737,471

[22] PCT Filed: May 18, 1995

[86] PCT No.: PCT/FR95/00651

§ 371 Date: Jan. 29, 1997

§ 102(e) Date: Jan. 29, 1997

[87] PCT Pub. No.: WO95/32050

PCT Pub. Date: Nov. 30, 1995

[30] Foreign Application Priority Data

May 19, 1994 [FR] France .................... 94 016138

[51] Int. Cl.⁶ ........................................ C25B 1/02
[52] U.S. Cl. .................... 205/634; 205/636; 205/687; 204/252; 204/257; 204/265; 204/266; 204/291; 204/421; 429/33; 429/40; 429/193
[58] Field of Search ................ 205/634, 636, 205/687; 204/252, 265, 266, 257, 291, 421; 429/33, 40, 193

[56] References Cited

U.S. PATENT DOCUMENTS

| | | | |
|---|---|---|---|
| 5,573,655 | 11/1996 | Mairesse et al. | 205/634 |
| 5,582,710 | 12/1996 | Mairesse et al. | 205/634 |

FOREIGN PATENT DOCUMENTS

| | | |
|---|---|---|
| 399833 | 11/1990 | European Pat. Off. . |
| 2689016 | 5/1994 | France . |
| 93/16966 | 9/1993 | WIPO . |
| 94-06544 | 3/1994 | WIPO . |
| 94-06545 | 3/1994 | WIPO . |

*Primary Examiner*—Bruce F. Bell
*Attorney, Agent, or Firm*—Burns, Doane, Swecker & Mathis, LLP

[57] ABSTRACT

A composite structure comprising:

(i) a solid electrolyte which is an $O^{2-}$ anion conductor and essentially impermeable to gases;

(ii) a cathode; and (iii) an anode, wherein the cathode and anode are porous to gases and wherein the electrolyte is in contact with the cathode and anode, wherein at least one of the cathode and anode is a voluminal electrode comprising (a) at least one BIMEVOX compound and (b) an electronic conductor, forming a distinct solid phase, dispersed in the BIMEVOX compound so as to define, within respective volumes of the voluminal electrode, a plurality of triple contact points between an ambient gaseous atmosphere, the electrolyte, and the electronic conductor.

11 Claims, 3 Drawing Sheets

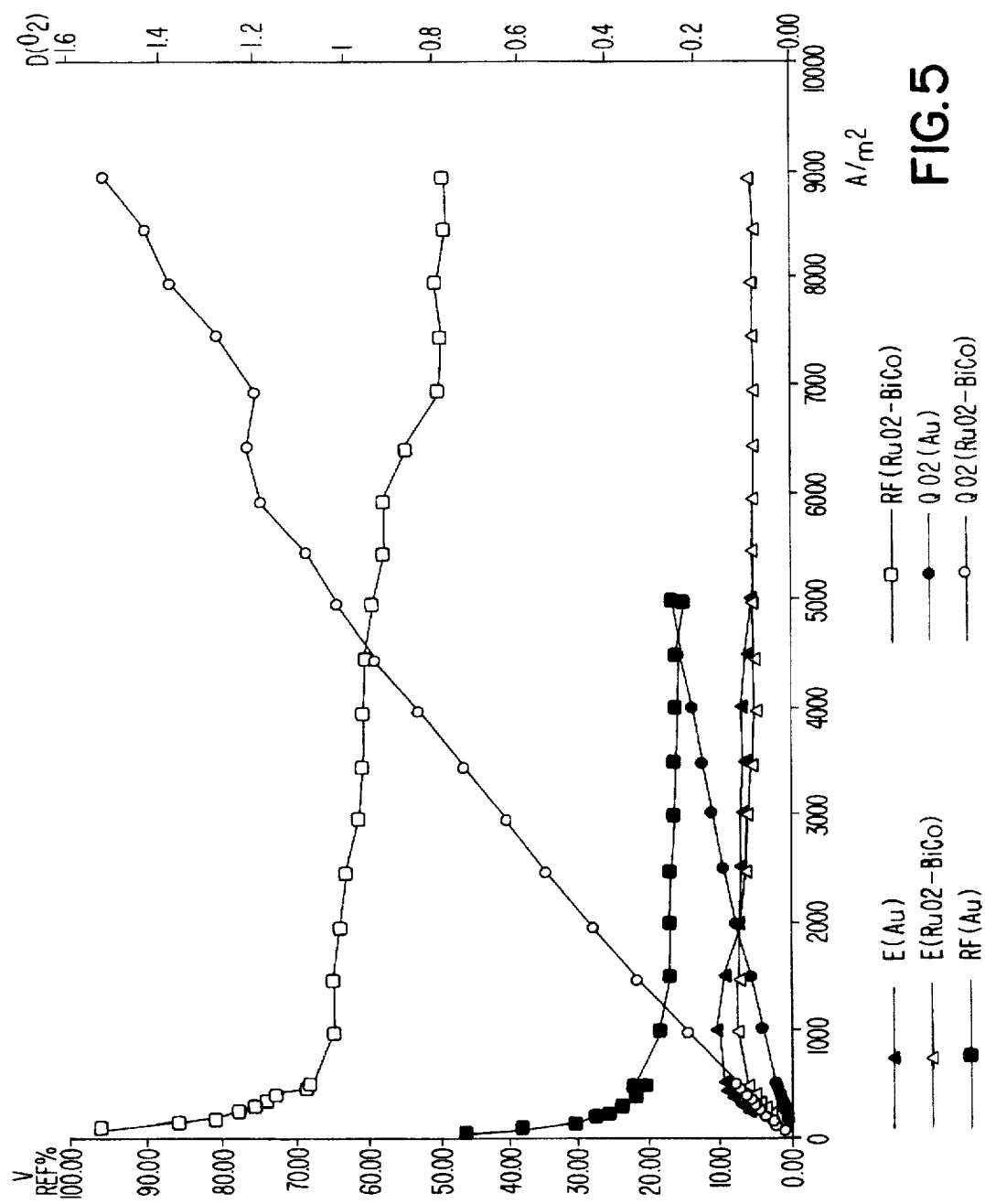

COMPOSITE STRUCTURE INCLUDING A SOLID ELECTROYLTE AND AT LEAST ONE VOLUME ELECTRODE

This application is a 371 of PCT/FR95/00651 filed on May 18, 1995.

BACKGROUND OF THE INVENTION (i) Field of the Invention

Various electrolyte/electrode couples can be used in the field of separating oxygen from air or from a mixture of gases containing it, by using an electrochemical cell with a solid electrolyte.

(ii) Description of Related Art

The operating principle of such an elementary cell is illustrated in FIG. 1. The oxygen molecules in the air are reduced at the cathode (C) into $O^{2-}$ ions which are then transported through the solid electrolyte (E) that is impermeable to the gases (stabilized zircon, cited by way of example in FIG. 1), under the effect of an electrical field; on the other face of the cell, these ions are oxidized at the anode (A) to generate the oxygen molecules. The performances of the cell thus depend on the ionic conductivity of the electrolyte and the capacity of the electrode materials to reduce the oxygen or to oxidize $O^{2-}$ ions at the working temperature.

The majority of solid electrolytes used for the separation of oxygen from air are stabilized zircons (for example, yttrium). These compounds make it possible to work between 700° and 800° C. (CERAMATEC INC., U.S. 4,879,016).

A new class of oxides, derived from $Bi_4V_2O_{11}$, in which a variable portion of vanadium is replaced by an element, for example, an alkaline-earth metal, a transition metal, a rare earth element or an element of groups III to V, was described in international patent application PCT WO91/01274. These oxides are conductors of $O^{2-}$ ions and their anionic conductivity at 300° C. is on the same order of magnitude as that of stabilized zircon at 600° C. These solid electrolytes can be used with different electrode couples.

The electrodes cited in the literature (Diploma of Higher Studies by T. IHARADA, University of Grenoble, September 1991) are either gold, platinum or LSM (lanthanum manganite doped with strontium).

These derivatives are often labeled with the generic name of BIMEVOX (University of Sciences and Technologies of Lille).

The BIMEVOX derivatives will generally have the following formula (I):

$$(Bi_{2-x}M_xO_2)(V_{1-y}M'_yO_z) \qquad (I)$$

where:

M represents one or several Bi substitution elements, chosen from among those that have an oxidation number of less than or equal to 3;

M' represents one or several V substitution elements, chosen from among those that have an oxidation number of less than or equal to 5;

the upper boundary values of x, y and z, being a function of the nature of the substituent elements M and M', it being understood that at least one of the indices x and y is not zero.

In particular, the BIMEVOX derivatives can also have the following formula (II):

$$(Bi_2O_2)(V_{1-y}M'_yO_z) \qquad (II)$$

where:

M' is as defined above, y not being zero;
or formula (III):

$$(Bi_{2-x}M_xO_2)(VO_z) \qquad (III)$$

where:

M is as defined above, x not being zero.

When it is present, M' is advantageously selected from among the alkaline metals, alkaline-earth metals, the transition metals, or the elements of groups III to V in the periodic table or among the rare earths.

But, while electrolytes based on BIMEVOX permit the transfer of $O^{2-}$ ions across their thickness at a low temperature (300° C.), the metallic electrodes, with which they are currently associated (Au, Pt) are electrodes with a low flux that do not permit correct catalytic dissociation of the oxygen molecules that are placed in contact with them. Furthermore, the very structure of this type of electrode considerably reduces the surface developed by the electrode-electrolyte interface. It was furthermore possible to discover that these inconveniences can also be encountered when these electrodes are used with conventional electrodes, other than those based on BIMEVOX. These solid electrodes, for example, are zircon, stabilized by a doping agent, such as yttrium, or calcium; or oxides of bismuth $Bi_2O_3$ doped or not doped by elements such as magnesium, calcium, yttrium, or erbium.

SUMMARY AND OBJECTIONS OF THE INVENTION

The object of the invention is to remedy these difficulties, in particular by developing new electrode-electrolyte systems that employ electrodes that are particularly adapted to BIMEVOX, at the same time having catalytic properties of $O_2$ dissociation, properties of electronic conduction and a developed surface, permitting oxygen transport at a high flow rate from one side to the other of these systems, in particular at temperatures between 300° and 700° C.

To make the above-mentioned systems, a composite structure is proposed according to the invention, comprising a solid electrolyte that is a conductor of O2anions, essentially impermeable to the gases, said electrolyte being in contact with two electrodes, one cathode and one anode respectively, both of which are porous with respect to gases, at least one of the cathode and anode being a voluminal electrode based on (i) at least one compound of the BIMEVOX type and (ii) an electronic conductor forming a distinct solid phase, dispersed in the preceding compound so as to define, within the respective volumes of this voluminal electrode, a plurality of triple contact points between an ambient gaseous atmosphere, the electrolyte, and the electronic conductor.

BRIEF DESCRIPTION OF THE DRAWINGS

FIGS. 4 and 5 supply curves relating to the comparative capacities of the cells according to the invention on the one hand, and the cells by way of comparison on the other hand, which are transferring the oxygen as a function of the time (FIG. 4) and as a function of the current density applied to said cells (FIG. 5).

DETAILED DESCRIPTION OF THE PREFERRED EMBODIMENTS

Figure 1:
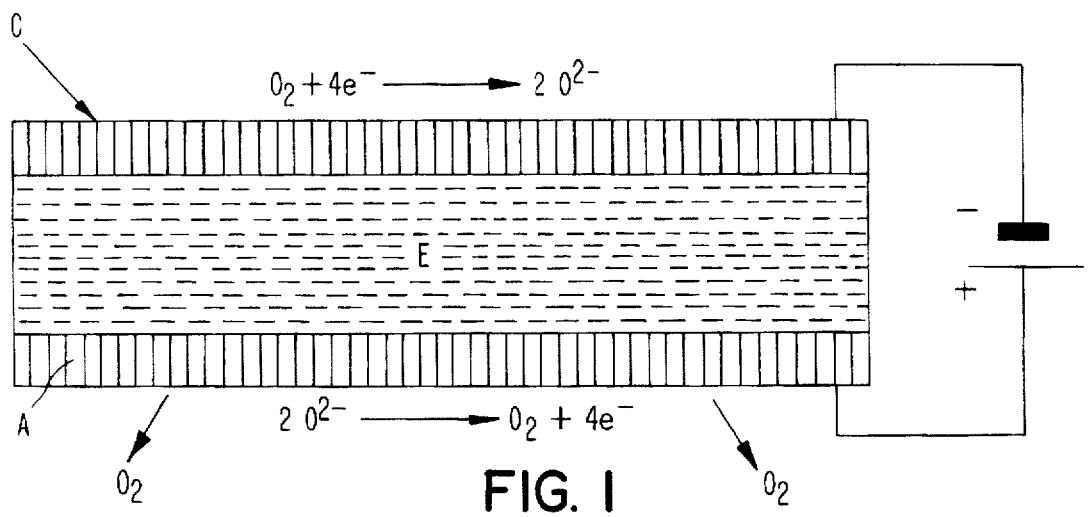
FIG. 1 shows the basic structure of an elementary cell, such as it was already envisioned earlier, to perform an electrochemical separation of the oxygen contained in air or in other gas mixtures.

In the context of this invention, BIMEVOX means a derivative of mixed oxide $Bi_4V_2O_{11}$, where at least one of the constituent elements, other than oxygen, is partially substituted by at least one substituent element, so that both the structural type of the gamma phase of $Bi_4V_2O_{11}$ and the equilibrium of charges will be maintained. These compounds and their preparation process are defined in international application WO 91/01274 as mentioned above, the disclosure of which is incorporated by reference in this specification.

The solid electrolyte is itself advantageously made on a base of a compound of the BIMEVOX type as defined above.

This solid electrolyte can also be made up of a zircon stabilized by a doping agent, such as yttrium or calcium, or oxides of bismuth $Bi_2O_3$, doped or not doped by elements such as magnesium, calcium, yttrium, or erbium.

A voluminal electrode according to the invention is of the kind that permits mixed ionic and electronic conduction.

In the voluminal electrode, there are at least two constituents, that is, at least one BIMEVOX and a metal or metallic oxide as an electronic conductor. These constituents are co-sintered with a view to obtaining the electrode. The respective grain sizes of these constituents, as well as the sintering time and temperature, are determined so that the structure of the composite layers will be sufficiently porous to permit the diffusion of the oxygen into their respective volumes.

Advantageously, a composite structure, according to the invention, comprises two voluminal electrodes, respectively one anode and one cathode, each based on at least one compound of the BIMEVOX type and an electronic conductor, as defined above.

It goes without saying that the indication of the essential constituents of the composite structures of the invention does not rule out the presence of other constituents, provided the latter do not in any noteworthy fashion interfere with the required properties of these composite structures (ionic and electronic conductibilities, porosity, etc.).

These composite structures are advantageously applicable for making up electrochemical cells for the separation or extraction of oxygen from a gas containing it and brought to the cathodic surfaces, and the recovery of this oxygen on the anodic sides of this structure, when they themselves are interspersed in an electric current supply circuit, permitting the creation of a potential difference between their opposite faces, if necessary, through the intermediary of current collectors in electrical contact with the electrodes of said composite structures. When the voltage induced between the opposite electrodes of the composite structure according to the invention is sufficient to permit the reduction of the oxygen that is admitted on the cathodic side, as $O^{2-}$ ions, and the oxidation of the $O^{2-}$ ions transferred through the electrolytes, then the extracted oxygen molecules can be recovered from the anodic side of the structure.

The oxygen reduction mechanism can be illustrated by the following equation.

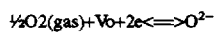

$$\frac{1}{2}O_2(gas) + Vo + 2e \Longleftrightarrow O^{2-}$$

This representation entails the advantage of showing the role of the "triple points," that is, sites that are simultaneously in contact with oxygen, with the electrolyte (Vo) and with the electronic conductor (2e).

The electrochemical chain can thus in particular be represented by the following scheme:

CC/BiMEVOX'-CE'/electrolyte/BiMEVOX"-CE"/CC where:

- the electrolyte, which is solid and impermeable to the gases, is advantageously a BIMEVOX whose dopant Me can in a nonrestrictive manner be at least one of the elements Ti, Co, Ni, Cu, Nb, Mn, Zn, etc.;

- CC represents the current collectors that ensure both the supply of the electrons at the surface of the cathode and their evacuation to the anode. These collectors, for example, made of gold, must naturally be compatible with the BIMEVOXES. These current collectors can be omitted when BIMEVOX-CE' and BIMEVOX-CE" have a sufficient electronic surface conductivity.

- BiMEVOX'-CE' and BIMEVOX"-CE" represent the two characteristic constituents of the electrodes in variable proportions, that is, on the one hand, a BIMEVOX and, on the other hand a "CE" electronic conductor, in particular, a metal or metallic oxide. This metal or the metal of metallic oxide can be identical or different from the metals of the BIMEVOXES.

Furthermore, the BIMEVOXES of BIMEVOX'-CE', BIMEVOX"-CE" and, if necessary, that of the electrolyte, can be identical or different.

The person skilled in the art will immediately understand the conditions that must be met by the electronic conductor that is added to each BIMEVOX of the voluminal electrodes, in addition to its electronic conduction:

(1) its capacity to form triple points with the different surrounding BIMEVOX or BIMEVOXES and the outside atmosphere, in particular, with air;

(2) it compatibility and, in other words, an absence of chemical reactivity with the different BIMEVOX or BIMEVOXES that entering the composite structures of the invention.

The physical conditions that the composite structures must meet according to the invention are in each case determined by the person skilled in the art.

Generally, it will always be advantageous to use electrolytes with a thickness that is as small as possible, if only to reduce the internal voltages.

With regard to the voluminal electrodes, their thickness will depend on the number of "triple points" that are formed. This thickness can often, as a matter of fact, be very small, as will be seen in the tests described below.

As indicated earlier, the respective BIMEVOXES that are used in the solid electrolyte and the voluminal electrodes can be identical or different. When they are identical, there may even be a certain continuity between the phases, especially when the voluminal electrode can be produced by means of diffusion, limited to portions of the thickness of the central stratum, as would appear to be the case when one makes deposits of $RuO_2$ oxide on the surfaces of a given electrolyte based on BIMEVOX.

Finally, with regard to the proportions in the voluminal electrodes of BIMEVOX, on the one hand, and the electronic conductor, on the other hand, it will be appreciated that they will in each case be determined as a function of the technical needs. One of the essential parameters to be considered naturally resides in the production of a sufficient number of triple points, as well as in the establishment of maximum ionic and electronic conductivity (without, however, harming the other parameters, especially porosity, conductivity, etc.). In an absolutely nonrestrictive manner, one might say that the weight proportions will vary, for example, from 20 to 80% of one of the constituents and from 80 to 20% of the other (apart from other chemical compounds that might possibly also be present in the voluminal electrodes).

It is also desirable to obtain a maximum number of triple points that will depend on the respective grain sizes of the two constituents, in particular, from 0.1 to 50μ on the average for BIMEVOX, and between 0.01 and 50μ for the electronic conductor.

Below, by way of example, we have the general conditions under which the composite structures according to the invention can be prepared in the laboratory.

(1) Preparation of solid electrolyte

The BIMEVOX materials are obtained by direct syntheses in the solid state starting from $Bi_2O_3$, $V_2O_5$ and the oxide of the substitution metal, mixed in stoichiometric proportions. This synthesis is defined in International application WO 91/01274.

(2) Formation of voluminal electrodes

The electrolyte material (the same as that of the electrolyte itself or another one) and the metallic particles are previously crushed and mixed in a composition suitable for forming lacquers, for example, one of the cells sold by Société Degussa, before being applied upon the electrolyte. The preparation is done in three stages:

15 minutes at 120° C. to eliminate the solvent, 1 hour at 350° C. to eliminate the binding agents, 5 hours between 700° C. and 770° C. to sinter the material that constitutes the voluminal electrode.

A current precollector, for example, based on gold, may also be placed on said material starting from a composition capable of forming a laquer.

It is therefore relatively easy to deposit the electrodes on the electrolyte, much easier than when one wishes to produce "simple electrodes" based on porous gold, which must then have a certain thickness to ensure good electronic surface conduction while retaining a certain porosity to achieve a sufficient number of "triple points." Using a voluminal electrode, the number of triple points is much more important; that also makes the deposition phase less critical. The reproducibility of the test is then quite a bit better.

Generally speaking, the following observations can be made with regard to the advantages provided by using the composite structures according to the invention in electrochemical cells of the type mentioned earlier, as compared to structures using "electrodes" based only on porous gold deposited on the two faces of a disk based on a BIMEVOX whose substituent element is cobalt (BICOVOX); these comparison structures are identified later in the figures and the legends which are reported by the abbreviation "Au:"

- possible lowering of applied voltages and increase in the service life of cells;
- increased boundary current densities supported by the cells;
- longevity of cells.

Supplementary features of the invention will appear during the following description of exemplary embodiments of the invention, in particular, with reference to the drawings.

EXAMPLE 1:

The cell in Example 1, below, was produced essentially for comparison purposes. It can be described schematically by the following electrochemical chain:

Au(CC)/BICOVOX/Au(CC)

or in a more abbreviated form: "Au" in the drawings.

Examples 2 and 3 more particularly relate to two distinct ways of implementing the invention.

EXAMPLE 2:

Au(CC)/BICOVOX-$RUO_2$/BICOVOX/BICOVOX-$RuO_2$/Au(CC) or in a more abbreviated form in the drawings, "$RuO_2$-BiCo"; and

EXAMPLE 3:

Au(CC)/BICOVOX-Au/BICOVOX/BICOVOX-Au/Au (CC)

1) Production of "Electrolyte-Electrode" composite structures.

Example 1):

An installation for the electrochemical separation of oxygen from the air is prepared in the following manner:

1. A solid electrolyte in the form of a disk is prepared from a powder having a composition derived from $Bi_4V_2O_{11}$ with the formula $Bi_2V_{0.9}Co_{0.1}O_{5.35}$ (BICOVOX). To do this, the powder is crushed so that the average diameter of the grains will be about 6 microns, with the grain size varying between 0.3 and 15 microns. The disk is obtained by pressing, applying a force on the order of 1 ton upon the crushed powder. It has a surface of 2 $cm^2$ and a thickness of 1.2 mm.

2. The disk is then sintered for 5 hours at 820° C. in an air atmosphere so as to obtain a mechanically strong product that will be impermeable to the gases, presenting a compactness on the order of 95%. 3. On a portion of each of the surfaces of the disk, a layer of gold-based lacquer is deposited with the help of a brush.

The disk is dried at 120° C. to eliminate the solvents and at 350° C. to expel the binding agents of the laquer; then it is sintered at 700° C. for about 1 minute in an air atmosphere to form the electrode deposits.

Examples 2 and 3:

The process in Example 1 is repeated, but:

- in Example 2, the gold-based lacquer is replaced by a lacquer containing a mixture of BICOVOX (40% by weight) and oxide of ruthenium (60% by weight), the layers thus formed then being sintered at 750° C. for 5 hours;
- in Example 3, the gold-based lacquer is replaced with a lacquer containing a BICOVOX mixture (40% by weight) and gold (60% by weight), the layers thus formed then being sintered at 750° C. for 5 hours.

Figure 2:
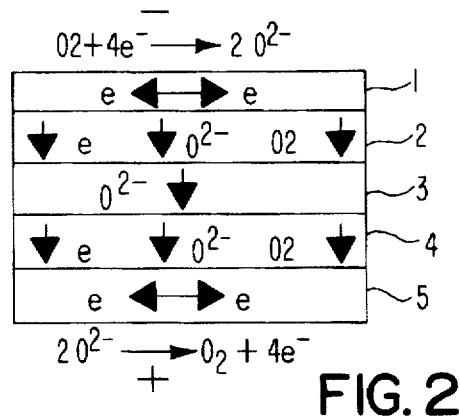
FIG. 2 is a basic diagram showing a cell on a base of solid electrolyte and electrode according to the invention.
Figure 3:
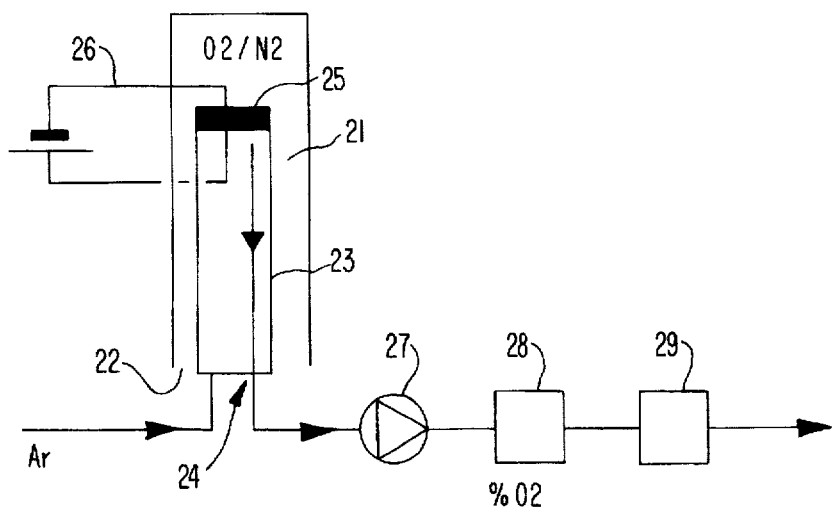
FIG. 3 is a diagram showing a research cell employing the invention, as well as attached elements that were used to make the measurements whose results are given later.

The basic diagram illustrating the composite structure thus obtained (for example, the one in FIG. 3), for instance, results from FIG. 2 where the reference numbers 1, 2, 3, 4, and 5 pertain, respectively to:

a CC (Au) collector;

a BICOVOX/Au cathode;

a BICOVOX electrolyte;

a BICOVOX/Au anode; and a CC (Au) collector.

2) Construction of a cell (experimental assembly):

This assembly comprises a first compartment 21, provided with an air intake 22. Inside this compartment there is housed a stainless steel tube 23, provided with an outlet 24. In its upper portion, it is provided with a disk 25, made up of a composite structure according to the invention. To hold the disk in a stable manner on the segment of the stainless steel tube and to ensure the electrical contact on the anode side, a gold joint (or a cement joint, known by the trade name of "CERASTIL C3") is applied. The electrical contact on the cathode side is provided by an outside metal rod, one of whose ends is in contact with the gold.

The composite structure making up the disk 25 itself is interspersed in an electrical circuit 26 to make it possible to apply, by means of appropriate collectors, a potential difference between the two opposite faces of the disk 25.

During operation for the electrochemical separation of oxygen from the air, the cathodic side of the disk is placed in contact with the air. Pure oxygen is recovered in the stainless steel tube on the anodic side of the cell. The stainless steel tube and the metal rod are connected to an electrical generator.

In other words, disk 25 (solid electrolyte provided on each of its faces with a voluminal electrode) provides for a separation between the first compartment, in which air is admitted, and the second compartment, from which one collects an oxygen-enriched gas. This gas is extracted from tube 23 with the help of a pump 27 and is analyzed for its oxygen content in an analyzer 28.

The generation of oxygen can be calculated by making a material balance between the input and the output of the installation:

$$QO_2 = Qtot\ (\%O2_e - \%O_{2r}) / (100 - \%O_{2r})$$

where:

$QO_2$ and $Qtot$: flow rate of $O_2$ and total flow rate;
% $O_{2e}$ and % $O_{2r}$: % $O_2$ for the test and in the gas to be separated and determined by analysis.

Figure 4:
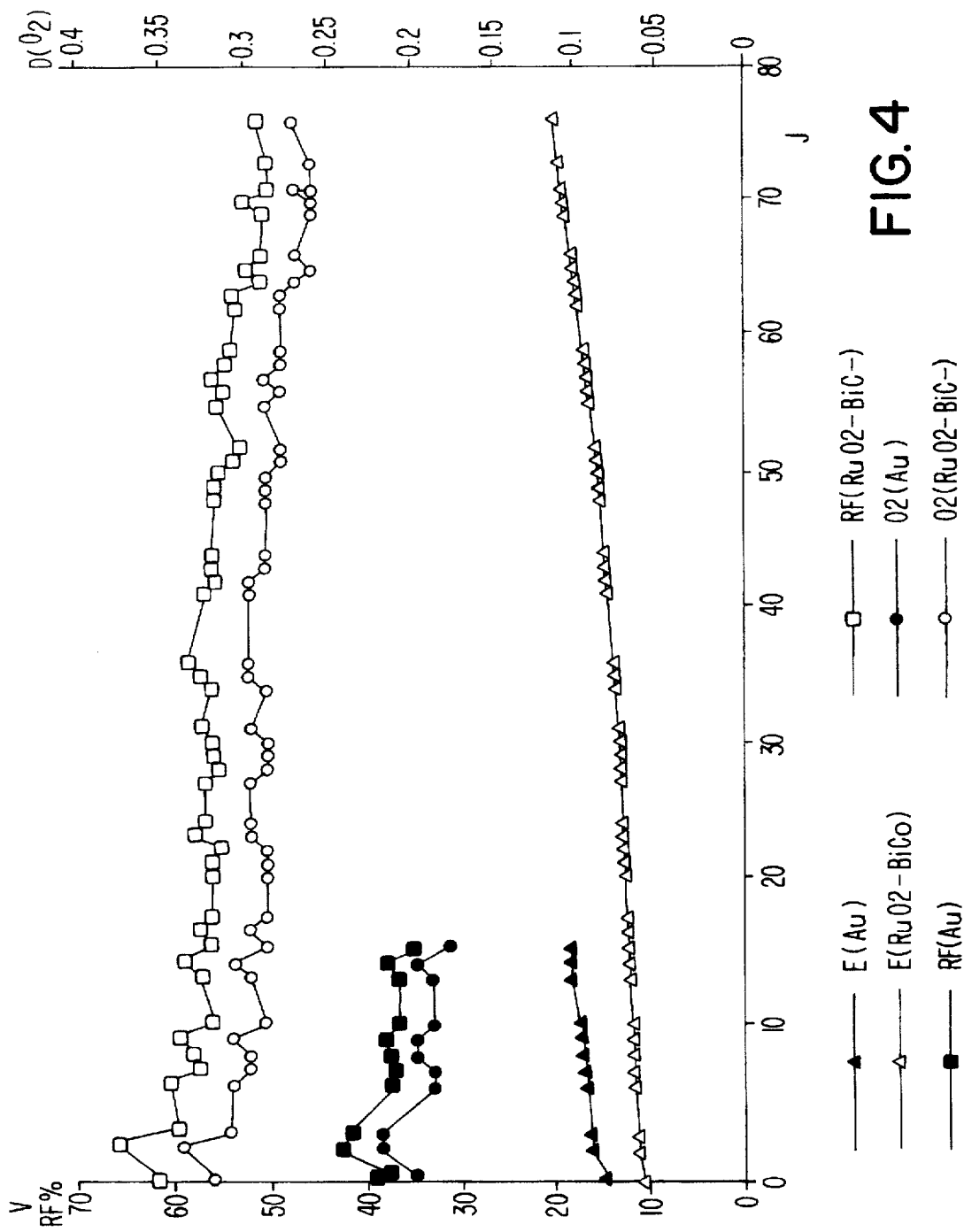

FIGS. 4 and 5 illustrate the comparative results obtained with the composite structure in Example 2 ($RuO_2$–BiCo), as compared to the results obtained with the structure in Example 1 (Au).

The curves in FIG. 4 are representative of the variations observed in the cells, the voltages applied to the cells, the Faraday yield RF % and the oxygen flow rates extracted electrochemically $D(O_2)$, measured in terms of $ml/mn/cm^2$, as a function of time (given in days), when they work with a current density of 1.493 $A/m^2$ and at a temperature of 340° C.

Parallel to this, the curves in FIG. 5 represent variations as a function of the applied current density ($A/m^2$), the voltages V, the Faraday yield RF % of the cell, and the oxygen flow rates $D(O_2)$ in the cells, also working at a temperature of 340° C.

The meaning of the various curves is given by the simplified legends that appear to the right of the drawings.

Looking at these curves, it seems that, under constant current density, the cells that implement the structure called "Au" cease to function beyond 15 days (destruction of electrodes or of collectors), as witnessed by the interruptions in the corresponding curves (FIG. 4).

On the other hand, cells working with the composite structure in Example 2 worked for close to 80 days, and did so under initially lower voltages; they changed only little with the passage of time and with very much higher Faraday yields and electrochemically transferred oxygen flow rates.

FIG. 5 shows that the comparison cells ceased to function the moment the current density exceeded 5,000 $A/m^2$, whereas the cells implementing the composite structures of the invention continued to work with a current density of 9,000 $A/m^2$, and they did so under voltages on the same order of magnitude, but of Faraday yields and flow rates of electrochemically transferred oxygen which were significantly greater.

By the same token, tests carried out with the composite structure in Example 3 have enabled one to observe their capacity to still permit an electrochemical transfer of oxygen under conditions that were indicated earlier, with a current density of 9,000 $A/m^2$, under the same temperature conditions (340° C.).

The use of voluminal electrodes, as defined in this invention, associated with an electrolyte of the BIMEVOX type, made it possible to increase considerably the performances of the composite structure (current density, Faraday yield, and cell voltage), while increasing the service life of that same structure.

It goes without saying that, in industrial processes, other techniques could be used to make the voluminal electrode deposits on the two sides of the electrolyte:

the outside surfaces of composite structures can be developed (honeycomb structures) without any essential supplementary problem with regard to supplying the current to the cell;

the risks of electrolyte degradation are very small (no excessively large local current densities that would be likely to degrade the electrolyte).

The above indicates that the invention will find particularly worthwhile uses in practical areas (at low temperature, especially between 300° and 500° C.):

for the generation of purified oxygen by separation of oxygen from the air with the help of other constituents of the latter;

the elimination of traces of oxygen that may still be present in a gas from which one wishes to remove the first constituent.

Practical applications are not given here by way of restriction. For example, this same technology can also be adapted in the case of oxygen detectors and analyzers, as well as in the case of gas purifiers (for example, elimination of $O_2$ from argon obtained by cryogenic distillation).

In each of the cases shown in these figures, the gases to be processed will be piped to the cathode side of the composite structures according to the invention, and the oxygen, transferred electrochemically through the composite structure, will be recovered or evacuated in a distinct compartment, separated from the first one, and encompassing the opposite face of this composite structure.

We claim:

1. A composite structure comprising:
(i) a solid electrolyte which is an $O^{2-}$ anion conductor and essentially impermeable to gases;
(ii) a cathode; and
(iii) an anode, wherein said cathode and anode are porous to gases and wherein said electrolyte is in contact with said cathode and anode,
wherein at least one of said cathode and anode is a voluminal electrode comprising (a) at least one BIMEVOX compound and (b) an electronic conductor, forming a distinct solid phase, dispersed in said BIMEVOX compound so as to define, within respective volumes of said voluminal electrode, a plurality of triple contact points between an ambient gaseous atmosphere, the electrolyte, and the electronic conductor, wherein said BIMEVOX compound is of the following formula (I):

$$(Bi_{2-x}M_xO_2)(V_{1-y}M'_yO_z) \qquad (I)$$

where:

M represents one or more Bi substitution elements having an oxidation number of less than or equal to 3;

M' represents one or more V substitution elements having an oxidation number of less than or equal to 5;

x, y and z have upper boundary values which are a function of the nature of the substituent elements M and M', and at least one of the indices x and y is not zero.

2. The composite structure according to claim 1 wherein the solid electrode comprises at least one BIMEVOX compound.

3. The composite structure according to claim 2 wherein the BIMEVOX compound in the solid electrode and the BIMEVOX compound in the voluminal electrode are identical.

4. The composite structure according to claim 1 wherein the electronic conductor, dispersed in the voluminal electrode, is a metal or a metal oxide.

5. The composite structure according to claim 1 wherein the electronic conductor, dispersed in the voluminal electrode, is an oxide of ruthenium $RuO_2$ or of gold.

6. An electrochemical cell comprising:
   (i) the composite structure of claim 1; and
   (ii) an electric current supply circuit which creates a potential difference between the anode and the cathode of said composite structure so as to permit reduction of molecular oxygen admitted to the cathode to $O^{2-}$ ions and oxidation of $O^{2-}$ ions transferred through the composite structure to molecular oxygen at the anode.

7. The electrochemical cell according to claim 6 further comprising a current collector, in contact with at least one of the cathode and anode of said composite structure, which connects the composite structure to the supply circuit.

8. An oxygen pump comprising:
   (i) at least one electrochemical cell according to claim 6;
   (ii) a gas supply compartment comprising oxygen for delivery to a contact at the cathode of the composite structure; and
   (iii) a gas receiving compartment, separated from the gas supply compartment, for receipt of oxygen that is electrochemically transferred to the anode of the composite structure.

9. A method for removing oxygen from a gas containing oxygen comprising the steps of:
   (i) supplying a gas containing oxygen to an anode of a composite structure comprising:
      (a) a solid electrolyte which is an $O^{2-}$ anion conductor and essentially impermeable to gases;
      (b) a cathode; and
      (c) an anode, wherein said cathode and anode are porous to gases and wherein said electrolyte is in contact with said cathode and anode;
   (ii) creating a potential difference between the anode and cathode of said composite structure so as to permit reduction of molecular oxygen admitted to the cathode to $O^{2-}$ ions and oxidation of $O^{2-}$ ions transferred through the composite structure to molecular oxygen at the anode; and
   (iii) recovering molecular oxygen from the cathode.

10. The method of claim 9 wherein said gas containing oxygen is air.

11. The method according to claim 9, wherein the oxygen contained in said gas containing oxygen is present in a trace quantity and is removed completely from said gas containing oxygen.

* * * * *